Figure 1:
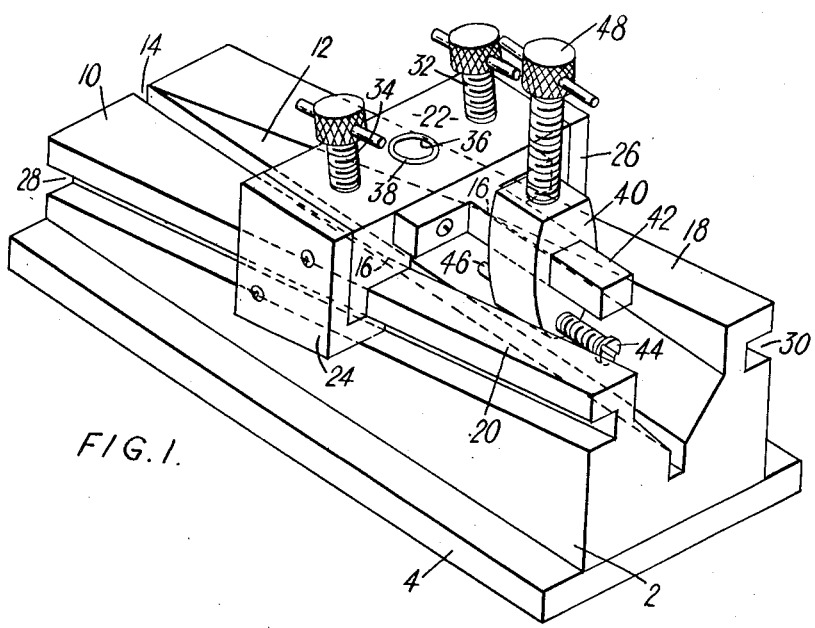

May 22, 1962  E. A. REVEL  3,035,462
WORK HOLDERS

Filed May 5, 1960  2 Sheets-Sheet 1

Inventor
Ernest Arthur Revel,
By
Stone & Maple
Attorneys.

May 22, 1962   E. A. REVEL   3,035,462
WORK HOLDERS
Filed May 5, 1960   2 Sheets-Sheet 2
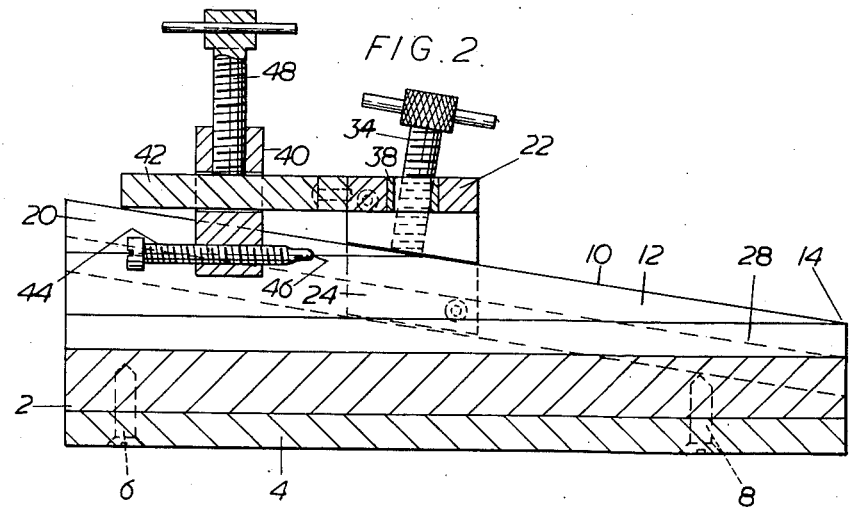
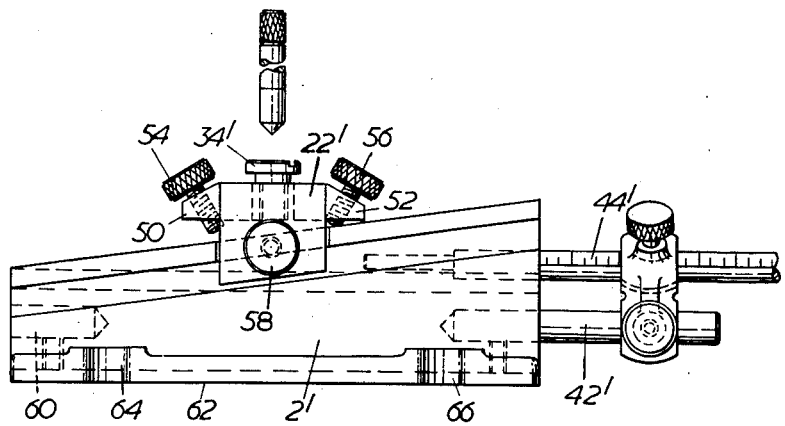
Inventor
Ernest Arthur Revel.
By
Stone & Mack.
Attorneys.

United States Patent Office 3,035,462
Patented May 22, 1962

3,035,462
WORK HOLDERS
Ernest Arthur Revel, 1A Gunnersbury Ave.,
Ealing, London, England
Filed May 5, 1960, Ser. No. 27,206
Claims priority, application Great Britain May 7, 1959
4 Claims. (Cl. 77—62)

The present invention relates to work holders and has as an object the provision of a work holder of the V-block type in a new and improved form.

Work holders of the V-block type, with which a work piece of tubular or bar-like form may be held seated and located in a V-shaped channel to facilitate the performance of operations such as drilling tapping or reaming thereon, are widely employed in engineering practice. Such work holders frequently incorporate a tool guide, for example a tool guide formed to hold a drilling bush, for use in locating the drill or other tool relative to the work piece. However, although the form of the channel and the clamping means provided enables work pieces of a wide range of cross-sectional sizes to be held seated and located, the tool guide has hitherto only been fully satisfactory with work pieces having a combination of cross-sectional size and shape such that it substantially contacts the tool guide; with other work pieces capable of being seated and located in the channel, there has been a clearance between the tool guide and the work piece which has tended to enable the tool to wander. It has therefore been desirable or necessary, depending upon the accuracy required, for the engineer to have available a set of work holders incorporating tool guides as aforesaid for use for example in the diametric drilling of round bars of different sizes.

In accordance with the present invention there is provided a work holder of the V-block type which comprises a body part formed with a seating channel of V-shaped or other seating and locating cross section and a tool guide slidable in engagement with the body part over, and in the direction of the channel, along a path which is inclined to the bottom of the channel.

With this novel arrangement, the tool guide may be slid relative to the body part into a position such that it contacts, and thus ensures optimum accuracy in the use of the tool on, a work piece having any combination of cross-sectional size and shape within a range of such combinations, the extent of which range depends upon the distance over which the tool guide is slidable and the inclination of the said path.

Various forms of construction may be adapted within the scope of the invention, forms in which the body part has a face along which the tool guide is slidable in contact and the channel is formed in said face being preferred; conveniently the tool guide is formed to slide in grooves formed in the body part and running parallel with said face.

The body part preferably has a base with which the bottom of the channel is parallel, so that the bottom of the channel is level when the base is horizontal such as when the body part is clamped upon the table of a vertical drilling machine.

The tool guide may be provided in any appropriate form. It may for example be formed with an aperture for locating a drilling bush of selected size centrally with respect to the channel.

Advantageously, in order to provide for setting the position of the work piece in the axial direction thereof when the work holder is clamped in position on the body part, there is provided a work-engaging stop adjustable in position relative to the length of the channel.

The stop may be carried by the tool guide or by the body part, the latter being the more convenient if the tool guide is provided with clamping means for the work piece.

In a preferred form of the work holder, the tool guide has a slack sliding fit with the body part and clamping means is provided which is operable to clamp the tool guide relative to the length of the channel and, by taking up the slackness to move the tool guide away from the bottom of the channel. When with this arrangement, the position of the tool guide is set by sliding it into contact with the first work piece of a series, the action of clamping the tool guide ensures that the work piece is left with a sliding fit, rather than being clamped so that it may readily be exchanged for the others.

The following description of two preferred embodiments of the invention, in which reference is made to the accompanying drawings, is given by way of illustration.

In the drawings:
FIGURE 1 shows the first embodiment in perspective,
FIGURE 2 shows the first embodiment in longitudinal cross section, and
FIGURE 3 shows the second embodiment in side elevation.

In the embodiment shown in FIGURES 1 and 2, there is provided a body part in the form of a steel block 2 having a projecting base plate 4 secured to its under-surface by four screws of which two (6 and 8) are shown in FIGURE 2. The upper surface 10 of the block is inclined to the base plate as shown, and is formed with a 90° channel 12 the bottom of which is parallel with the base plate. At one end, 14, the channel is of very small depth and width. It reaches its maximum required width at 16 is thereafter continued at constant width between upstanding wall portions 18 and 20 of increasing height.

On the upper surface of the block 2, is slidably carried a tool guide 22 provided with side pieces 24 and 26 having inwardly directed projections which engage with grooves 28 and 30 cut in the sides of the block 2 parallel with the surface 10 thereof. Clamping screws 32 and 34, substantially perpendicular to the surface 10 enable the tool guide 22 to be clamped in any position along the block. An aperture 36 having a hardened steel liner 38 force-fitted therein is provided at the centre of the tool guide for locating a selected drilling bush with its axis perpendicular to the line of intersection of the inclined walls of the channel 12.

A block 40 which is slidable over a bar 42 mounted on the side of the work holder remote from the end 14 and which may be clamped in position on said bar by a screw 48, projects downwardly into the channel and is provided near its lower end with a screw-threaded stop 44, the end 46 of which serves as an abutment for the end of a work piece when located in the channel. The block 40 may be removed when not required.

In the use of the work holder, a work piece of square or circular cross section is laid in the channel and the tool guide is slid in the direction of end 14 until it contacts the work piece. The tool guide is then clamped in position by turning the screws 32 and 34. Because the side pieces 24 and 26 are slightly clear of the upper surfaces of the grooves 28 and 30 when the tool guide lies in contact with the surface 10, the action of tightening the screws 32 and 34, raises the tool guide by a corresponding slight amount and gives the work piece a sliding, rather than clamped, fit thereunder. The axial position of the work piece may then be adjusted and the end 46 of the stop 44 moved into contact therewith by sliding the block 40, turning the stop 44 or both. The work piece can then be drilled very accurately using a drill and corresponding bush. Preferably the bush is of such length that its lower end projects below by an amount corresponding with the amount of clearance in the grooves 28 and 30.

After having been drilled, the work piece is readily withdrawn and replaced by one or a series of similar pieces.

In the embodiment shown in FIGURE 3, the tool guide 22' is formed in one piece and has projecting lugs 50, 52 which carry centrally located milled headed screws 54 and 56 for clamping the work piece if required. For clamping the tool guide 22' firmly where required, there is provided a slot-headed screw 34' to one side of the central aperture (not shown) provided for locating a drilling bush (cf. aperture 36 FIGURE 1). Light clamping is obtainable by a milled-headed screw 58, similar to the screws 54 and 56 on one side of the tool guide.

In this embodiment, a movable work engaging stop 44' is mounted upon a bar 42' secured by a set screw in a recess bored in one end of the body part 2'. A similar recess 60 enables the bar 42' and stop 44' to be secured at the opposite end of the body part if required.

The tool guide 22' and the body part 2' are each of integral construction, the latter having flanges along each side adjacent to its bottom surface 62, each of which is formed with a pair of slots (of which one pair 64, 66 is shown in FIGURE 3) by which the body part may be bolted down to, for example, the table of a drilling machine.

It will be understood that various departures may be made from the specific constructions just described without departing from the scope of the invention. For example, the work piece may be formed to receive drilling bushes at one or more positions displaced from the centre line or the channel may be shaped to receive hexagonal work pieces with their longer cross-sectional axes vertical. Moreover, as the work holder is capable of taking work pieces having a wide range of sizes, a set of tool guides for different drilling positions may be provided; to provide such a set for every one of the series of work holders previously required would not normally be feasible.

I claim:

1. A work holder of the V-block type which comprises a block formed in one face thereof with an open-ended work seating channel, a tool guide slidably engaged with said block for movement over and in the length direction of the channel along a path which is inclined to and convergent with the bottom of the channel, and clamping means operable to clamp the tool guide relative to the block.

2. A work holder of the V-block type which comprises a block formed with a pair of mutually parallel grooves positioned one on each side thereof and with a planar face which lies parallel with said grooves, a tool guide slidable along said planar face in engagement with said grooves and, formed along said face, an open-ended work seating channel the bottom of which is inclined to said face and to said grooves, and clamping means operable to clamp the tool guide in any position along said face.

3. A work holder of the V-block type which comprises a block formed with an open-ended work seating channel and a base surface with which the bottom of the channel is substantially parallel, a tool guide slidably engaged with said block for movement over, and in the length direction of the channel along a path which is inclined to and convergent with the bottom of the channel, clamping means operable to clamp the tool guide relative to the block and a work engaging stop continuously adjustable in position relative to the length of the channel.

4. A work holder of the V-block type which comprises a block formed with an open-ended work seating channel and a pair of grooves, a tool guide slidable in slack engagement with the grooves over, and in the length direction of, the channel along a path which is inclined to and convergent with the bottom of the channel and, on the tool guide, clamping means operable, by bearing upon the block, to clamp the work holder in position on the block and simultaneously take up the slackness of the engagement of the tool guide with the grooves by moving the tool guide away from the bottom of the channel.

References Cited in the file of this patent

UNITED STATES PATENTS 2,705,431    D'Angelo _____ Apr. 5, 1955

OTHER REFERENCES

"Drill Jig for Pins" from American Machinist Magazine for March 9, 1916; page 428. (Copy in Div. 58.)